(12) United States Patent
Lesmeister et al.

(10) Patent No.: US 9,172,288 B2
(45) Date of Patent: Oct. 27, 2015

(54) REINFORCED FLEXIBLE TEMPERATURE SENSOR

(71) Applicant: Measurement Specialties, Inc., Hampton, VA (US)

(72) Inventors: Brad Lesmeister, Prior Lake, MN (US); Peter David Bernier, Minneapolis, MN (US); Mark Jeffery Swenson, Andover, MN (US); Robert Lawrence Geiselman, Loretto, MN (US)

(73) Assignee: Measurement Specialities, Inc., Hampton, VA (US)

( * ) Notice: Subject to any disclaimer, the term of this patent is extended or adjusted under 35 U.S.C. 154(b) by 14 days.

(21) Appl. No.: 14/038,141

(22) Filed: Sep. 26, 2013

(65) Prior Publication Data

US 2014/0103784 A1     Apr. 17, 2014

Related U.S. Application Data

(60) Provisional application No. 61/705,975, filed on Oct. 16, 2012, provisional application No. 61/790,751, filed on Mar. 15, 2013.

(51) Int. Cl.
*G01K 1/14* (2006.01)
*H02K 11/00* (2006.01)
*G01K 7/16* (2006.01)

(52) U.S. Cl.
CPC .............. *H02K 11/0047* (2013.01); *G01K 7/16* (2013.01)

(58) Field of Classification Search
USPC ....................................................... 310/68 C
See application file for complete search history.

(56) References Cited

U.S. PATENT DOCUMENTS

| 2,530,256 | A | 11/1950 | Malek |
| 2,619,573 | A | 11/1952 | Dawson, Jr. |
| 2,749,753 | A | 6/1956 | Adams |
| 2,758,294 | A | 8/1956 | Duncan |
| 2,802,925 | A | 8/1957 | Seelen et al. |
| RE24,436 | E | 2/1958 | Jacobson et al. |

(Continued)

FOREIGN PATENT DOCUMENTS

JP          57079689 A      5/1982

OTHER PUBLICATIONS

International Search Report dated Mar. 6, 2014 for related PCT application No. PCT/US2013/061978.
"U.S. Appl. No. 10/391,531, Final Office Action mailed Apr. 23, 2007", 19 pgs.
"U.S. Appl. No. 10/391,531, Non-Final Office Action mailed Aug. 29, 2006", 18 pgs.

(Continued)

*Primary Examiner* — Lisa Caputo
*Assistant Examiner* — Nasir U Ahmed
(74) *Attorney, Agent, or Firm* — Howard IP Law Group, PC

(57) ABSTRACT

A stator winding temperature sensor including at least one sensing wire for connecting to a stator. The sensor also includes a body, including a core material comprising a polyimide substrate having an acrylic adhesive surrounding at least a portion of the sensing wire, and a laminate material over the core material. The body has a thickness adapted to protect the sensing wire. The sensor includes a lead wire for connecting to an external monitoring device. The sensing wire is electrically connected to the lead wire at a lead step portion of the sensor. The sensor further includes a tab extending from the lead wire and encompassing the lead step, the tab including a flexible zone where the tab is surrounded by a polyimide and an adhesive but is not surrounded by fiberglass.

20 Claims, 6 Drawing Sheets

(56) References Cited

U.S. PATENT DOCUMENTS

| | | | |
|---|---|---|---|
| 2,945,265 | A | 7/1960 | Sell, Jr. et al. |
| 2,994,219 | A | 8/1961 | Schaschl |
| 3,049,012 | A | 8/1962 | Daniels |
| 3,165,426 | A | 1/1965 | Beckam |
| 3,339,164 | A | 8/1967 | Landis et al. |
| 3,343,589 | A | 9/1967 | Holzl |
| 3,388,458 | A * | 6/1968 | Logan .......................... 29/596 |
| 3,589,360 | A | 6/1971 | Sinclair |
| 3,975,720 | A | 8/1976 | Chen et al. |
| 4,042,900 | A | 8/1977 | Hinton et al. |
| 4,122,322 | A | 10/1978 | Ohkubo et al. |
| 4,289,553 | A | 9/1981 | Nolf |
| 4,369,795 | A | 1/1983 | Bicher |
| 4,419,169 | A | 12/1983 | Becker et al. |
| 4,437,084 | A | 3/1984 | Clayton, Jr. |
| 4,527,909 | A | 7/1985 | Dale et al. |
| 4,553,023 | A | 11/1985 | Jameson et al. |
| 4,607,154 | A | 8/1986 | Mills |
| 4,698,756 | A | 10/1987 | Gonzalez et al. |
| 4,827,487 | A | 5/1989 | Twerdochlib |
| 4,848,926 | A | 7/1989 | Jenkins |
| 4,977,385 | A | 12/1990 | McQueen |
| 4,994,780 | A | 2/1991 | McQueen |
| 5,161,894 | A | 11/1992 | Bourigault |
| 5,221,916 | A | 6/1993 | McQueen |
| 5,460,041 | A | 10/1995 | Andes et al. |
| 5,666,593 | A | 9/1997 | Amico |
| 5,749,656 | A | 5/1998 | Boehm et al. |
| 5,769,622 | A | 6/1998 | Aoki et al. |
| 5,831,511 | A | 11/1998 | Manning et al. |
| 5,833,688 | A | 11/1998 | Sieben et al. |
| 5,864,282 | A | 1/1999 | Hannigan et al. |
| 5,889,460 | A | 3/1999 | Bachmann et al. |
| 5,906,584 | A | 5/1999 | Pavoni et al. |
| 5,938,624 | A | 8/1999 | Akerfeldt et al. |
| 5,955,960 | A | 9/1999 | Monnier |
| 5,959,524 | A | 9/1999 | Wienand et al. |
| 5,999,081 | A | 12/1999 | Hannigan et al. |
| 6,028,382 | A | 2/2000 | Blalock |
| 6,078,830 | A | 6/2000 | Levin et al. |
| 6,117,088 | A | 9/2000 | Kreizman et al. |
| 6,123,675 | A | 9/2000 | Kreizman et al. |
| 6,162,184 | A | 12/2000 | Swanson et al. |
| 6,213,995 | B1 | 4/2001 | Steen et al. |
| 6,262,574 | B1 | 7/2001 | Cho et al. |
| 6,267,746 | B1 | 7/2001 | Bumbalough |
| 6,322,559 | B1 | 11/2001 | Daulton et al. |
| 6,323,413 | B1 | 11/2001 | Roth et al. |
| 6,354,735 | B2 | 3/2002 | Thermos et al. |
| 6,440,129 | B1 | 8/2002 | Simpson |
| 6,456,863 | B1 | 9/2002 | Levin et al. |
| 6,539,981 | B1 | 4/2003 | Kleven et al. |
| 6,547,788 | B1 | 4/2003 | Maguire et al. |
| 6,623,821 | B1 | 9/2003 | Kendig |
| 6,639,505 | B2 | 10/2003 | Murata et al. |
| 6,655,835 | B2 | 12/2003 | Mattoon et al. |
| 6,666,578 | B2 | 12/2003 | Gibbs et al. |
| 6,698,922 | B2 | 3/2004 | Adachi et al. |
| 6,738,566 | B2 | 5/2004 | Pagnella |
| 6,886,977 | B2 | 5/2005 | Kaminski et al. |
| 6,977,575 | B2 | 12/2005 | Bernier et al. |
| 6,986,746 | B2 | 1/2006 | Fox et al. |
| 6,991,370 | B2 | 1/2006 | Kofune et al. |
| 7,029,173 | B2 | 4/2006 | Engel et al. |
| 7,053,509 | B2 | 5/2006 | Ryan et al. |
| 7,090,645 | B2 | 8/2006 | Fox et al. |
| 7,111,983 | B2 | 9/2006 | Hudson |
| 7,361,830 | B2 | 4/2008 | Richetto et al. |
| 7,719,400 | B1 | 5/2010 | Bernier et al. |
| 7,864,026 | B2 | 1/2011 | Bernier |
| 8,106,741 | B2 | 1/2012 | Bernier et al. |
| 8,251,579 | B2 | 8/2012 | Lesmeister et al. |
| 2002/0048312 | A1 | 4/2002 | Schurr et al. |
| 2002/0135454 | A1* | 9/2002 | Ichida et al. .................... 338/25 |
| 2002/0189342 | A1 | 12/2002 | Ishiguro et al. |
| 2002/0198465 | A1 | 12/2002 | Fox et al. |
| 2003/0050634 | A1 | 3/2003 | Ellman et al. |
| 2003/0209264 | A1 | 11/2003 | Richetto et al. |
| 2004/0094706 | A1 | 5/2004 | Covey et al. |
| 2004/0114665 | A1 | 6/2004 | Park et al. |
| 2004/0233034 | A1 | 11/2004 | Bernier |
| 2004/0238023 | A1 | 12/2004 | Richetto et al. |
| 2006/0247726 | A1 | 11/2006 | Biggs et al. |
| 2006/0284722 | A1 | 12/2006 | Bernier |
| 2009/0026894 | A1* | 1/2009 | Lesmeister et al. ............. 310/68 |
| 2009/0044849 | A1 | 2/2009 | Richetto et al. |
| 2010/0278213 | A1 | 11/2010 | Bernier et al. |
| 2011/0026562 | A1 | 2/2011 | Bernier et al. |

OTHER PUBLICATIONS

"U.S. Appl. No. 10/391,531, Notice of Allowance mailed Nov. 28, 2007", 9 pgs.

"U.S. Appl. No. 10/391,531, Response filed Oct. 18, 2007 to Final Office Action Mailed Apr. 23, 2007", 10 pgs.

"U.S. Appl. No. 10/391,531, Response filed Feb. 26, 2007 to Non-Final Office Action mailed Aug. 29, 2006", 10 pgs.

"U.S. Appl. No. 10/801,496, Non-Final Office Action mailed Aug. 13, 2008", 13 pgs.

"U.S. Appl. No. 11/312,240, Non-Final Office Action mailed Apr. 4, 2008", 5 pgs.

"U.S. Appl. No. 11/312,240, Non-Final Office Action mailed Mar. 1, 2007", 7 pgs.

"U.S. Appl. No. 11/312,240, Response filed Jul. 7, 2008 to Non-Final Office Action mailed Apr. 4, 2008", 7 pgs.

"U.S. Appl. No. 11/312,240, Response filed Aug. 1, 2007 to Non-Final Office Action mailed Mar. 1, 2007", 12 pgs.

"U.S. Appl. No. 11/462,020, Non-Final Office Action mailed Jul. 31, 2009", 9 pgs.

"U.S. Appl. No. 11/462,020, Notice of Allowance mailed Feb. 22, 2010", 6 pgs.

"U.S. Appl. No. 11/462,020, Preliminary Amendment filed Nov. 13, 2006", 9 pgs.

"U.S. Appl. No. 11/462,020, Response filed Oct. 22, 2009 to Non-Final Office Action mailed Jul. 31, 2009" 8 pgs.

"U.S. Appl. No. 11/462,020, Restriction Requirement mailed Mar. 4, 2009", 5 pgs.

"Fluoroplastic Heat Shrink Tubing", (online) retrieved from: (retrieved on Aug. 17, 2006), 3 pgs.

"Heat Shrink Tubing—Frequently Asked Questions", (online) retrieved from Advanced Polymers, Inc. website, (retrieved on Sep. 21, 2007) 1 pg.

"Melt Definition", Webster's Third New International Dictionary, (online) retrieved from (1993), 2 pgs.

"SMT-6-12", (online) retrieved from (2006) (Retrieved on Aug. 17, 2006), 1 pg.

"Thermocouples", (online) retrieved from Pico Technologies website, (Retrieved on May 8, 1999), 3 pgs.

Advanced Polymers, Inc., "The World's Thinnest, Smallest, & Strongest Heat Shrink Tubing brochure", 2 pgs.

Lomber, S.G., et al., The Cryoloop: an adaptable reversible cooling deactivation method for behavioral or electrophysiological assessment of neural function, Journal of Neurosecience Methods, 86, (1999), 179-194.

Mark, S., "Using Thin-Wall Heat-Shrink Tubing in Medical Device Manufacturing", (online) Retrieved from (retrieved on Aug. 29, 2006), 6 pgs.

Richetto, Audeen, et al., "Multi-Point Polymer Encapsulated Micro-Thermocouple", U.S. Appl. No. 60/455,617, filed Mar. 17, 2003, 18 pgs.

"U.S. Appl. No. 12/776,655, Notice of Allowance mailed Sep. 23, 2011" 8 pgs.

U.S. Appl. No. 12/776,655, Response filed Aug. 19, 2011 to Restriction Requirement mailed Jul. 21, 2011, 6 pgs.

U.S. Appl. No. 12/776,655, Restriction Requirement mailed Jul. 21, 2011, 7 pgs.

U.S. Appl. No. 12/776,655, Supplemental Notice of Allowability mailed Nov. 16, 2011, 4 pgs.

* cited by examiner

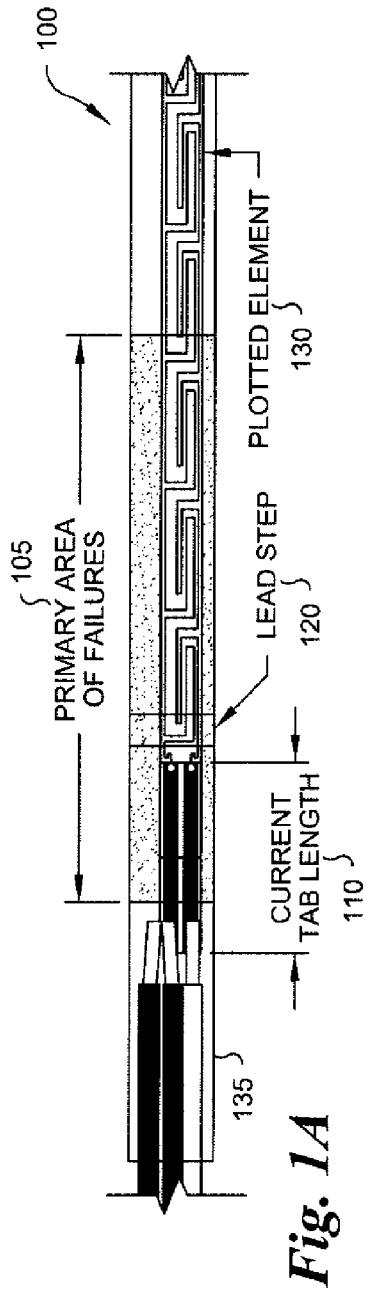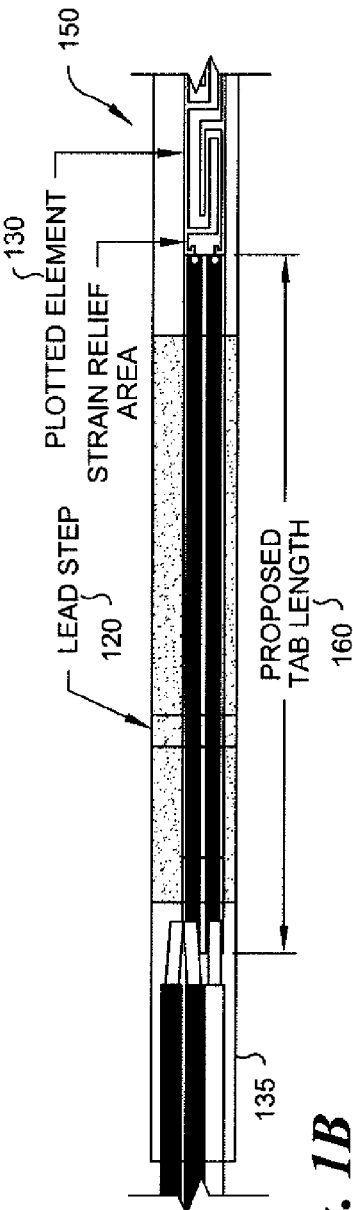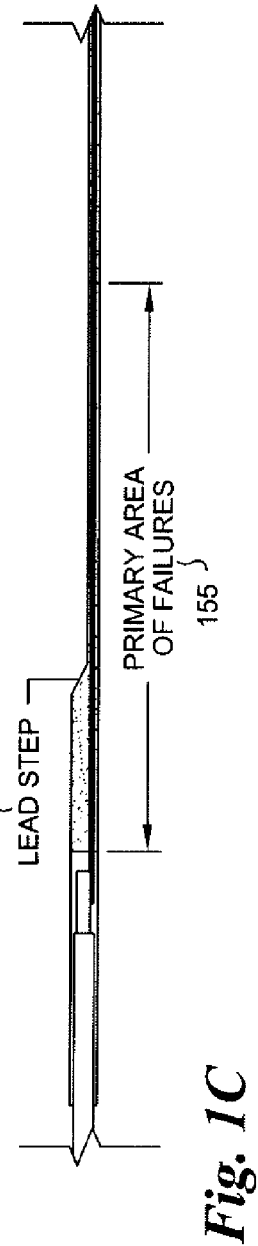
Fig. 1A
Fig. 1B
Fig. 1C

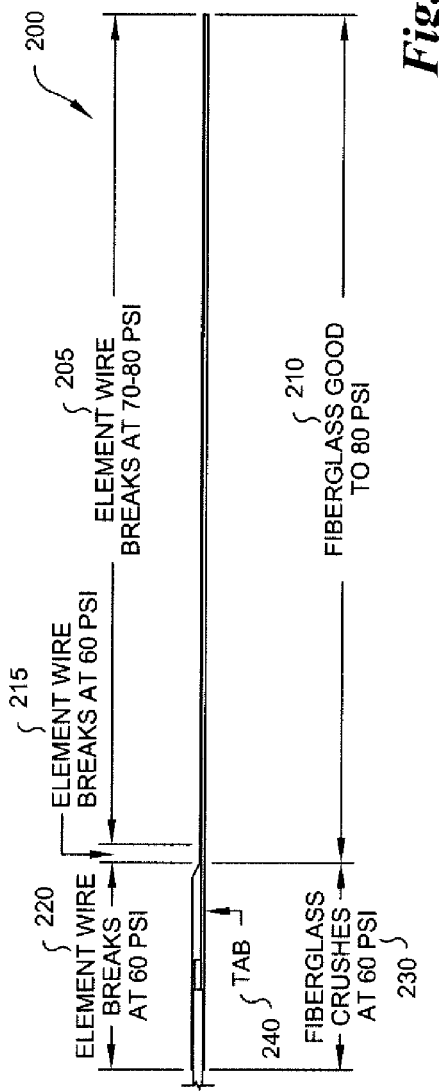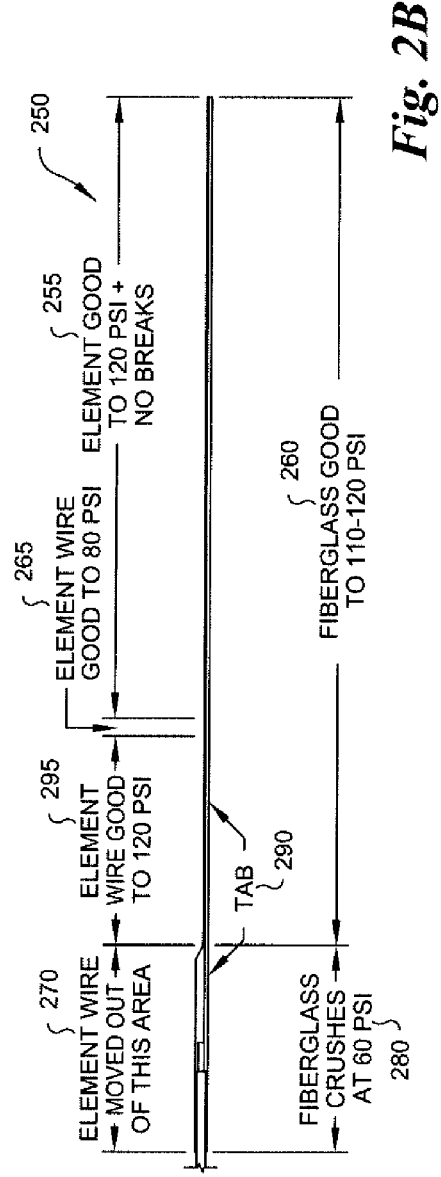

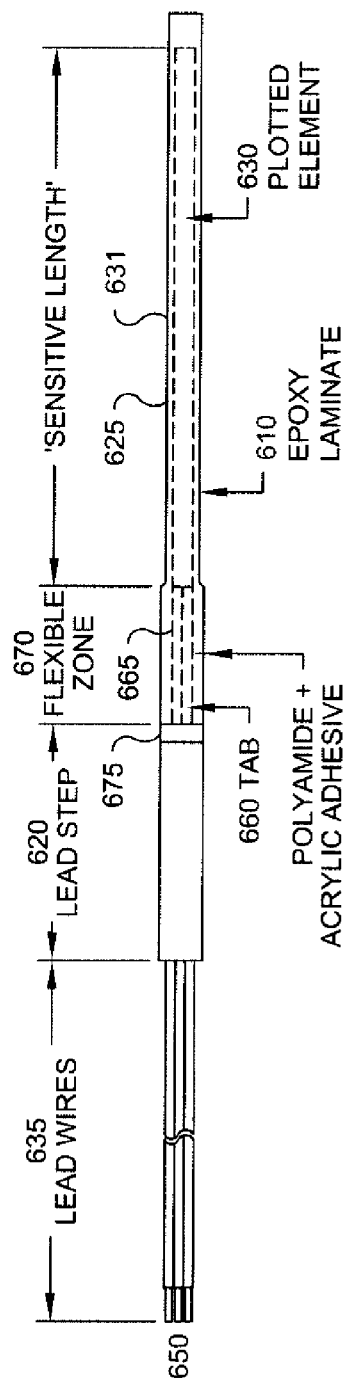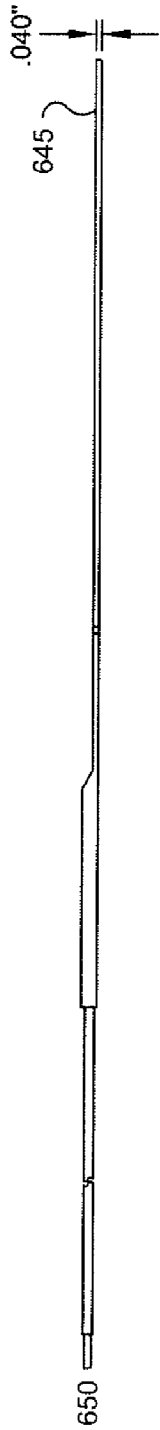
Fig. 6A
Fig. 6B

REINFORCED FLEXIBLE TEMPERATURE SENSOR

CROSS-REFERENCE TO RELATED APPLICATIONS

This application claims the benefit of U.S. Provisional Patent Application No. 61/705,975, filed Sep. 26, 2012, and U.S. Provisional Patent Application No. 61/790,751, filed Mar. 15, 2013, the entire disclosures of which are incorporated by reference herein for all purposes.

TECHNICAL FIELD

This disclosure relates generally to temperature sensors, and more particularly to systems and methods for performing robust temperature measurement of motor and generator stator windings.

BACKGROUND

A resistance-based temperature sensor, or resistance temperature detector (RTD), can be used in a number of applications to measure the operating temperature of an environment or system based on a sensed change in resistance in one or more wires incorporated into the sensor. When connected to a stator, such as those used in motors, generators and auxiliary equipment, an RTD can be used to detect temperatures in stator windings, as well as the temperatures of associated air and gas streams.

To connect an RTD to a stator, the RTD is typically installed inside the stator core. This may be accomplished by installing the RTD completely within an opening or slot formed between the stator windings or coils, with only the sensor's associated insulated wires protruding past an edge of the stator core. Typically, this type of RTD includes a thin, rigid body (e.g. a fiberglass body) for housing the sensing portion. Relatively large electrical leads forming the connection to the sensing portion generally do not fit inside the fiberglass body. Accordingly, these arrangements require the formation of a "lead step", which may comprise a deposit of fiberglass material on the lead wire ends where they join the fiberglass body. This lead step makes the RTD installation process and its positioning inside a motor or generator more difficult than other applications, as well as susceptible to damage during motor or generator manufacturing.

Further, RTDs used in stator and other space-constrained applications often exhibit tensile failures during installation and manufacturing, as RTDs are friction fit, for example, within the stator windings. The cause of these failures can be linked to stress on the RTD sensing wire resulting from the installation process, which can include pressure, blows with rubber mallets, and bending of the lead end/lead step area of the RTD at the edge of the stator core.

Accordingly, more robust stator winding temperature sensors are desired.

SUMMARY

In one embodiment of the present disclosure, a temperature sensor for sensing the temperature of a stator and communicating the sensed temperature to an external monitoring device is provided. The sensor comprises at least one sensing wire adapted to be fit within stator. The sensor further comprises a rigid body, such as a fiberglass body, including a core material comprising a polyimide substrate having an acrylic adhesive surrounding at least a portion of the sensing wire, and an epoxy laminate material over the core material. A lead wire for connecting to the external monitoring device is also provided. A lead step is defined where the sensing wire is electrically connected to the lead wire. A conductive tab extending between the lead wire and the sensing wire may be provided which encompasses at least a portion of the lead step. The tab is configured to protect the lead step and the sensing wire in a region where the sensor is adapted to extend over an end of the stator.

In one advantageous embodiment, the sensor includes a flexible zone. The flexible zone may encompass the tab which extends between the lead wire and the sensing wire. The tab may be laminated between layers of a core material comprising, for example, a high-temperature resistant polyimide substrate, including a ribbon or tape. An adhesive may also be utilized for holding the wire and tab in position on the ribbon. In an embodiment, the flexible zone does not include an epoxy laminate or fiberglass, and thus, is not rigid.

In another embodiment of the present disclosure, a method for manufacturing a temperature sensor for sensing temperature of a stator is provided. The method comprises the steps of fitting a sensing wire to the stator to sense temperature of the stator. At least a portion of the sensing wire is surrounded with a core material comprising a polyimide substrate having an acrylic adhesive. The core material is surrounded with an epoxy laminate material to form a fiberglass body. A lead wire is electrically connected to an external monitoring device. The sensing wire is electrically connected to the lead wire at a lead step having a fiberglass body surrounding at least a portion of an elongated tab which is laminated with a polyimide substrate having an acrylic adhesive. The elongated tab extends from the lead wire and encompasses the lead step to protect the lead step and the sensing wire in a region where the sensor is adapted to extend over an end of the stator.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

BRIEF DESCRIPTION OF THE DRAWINGS

FIG. 1A illustrates a schematic diagram of a stator winding temperature sensor.

FIG. 1B illustrates a schematic diagram of a top view of a stator winding temperature sensor, according to an embodiment of the present disclosure.

FIG. 1C illustrates a schematic diagram of a side view of a stator winding temperature sensor, according to an embodiment of the present disclosure.

FIG. 2A illustrates a diagram of a stator winding temperature sensor, showing structural strength of regions of the sensor.

FIG. 2B illustrates a diagram of a stator winding temperature sensor, showing structural strength of regions of the sensor, according to an embodiment of the present disclosure.

FIG. 6A illustrates a top view of a stator winding temperature sensor, according to an embodiment of the present disclosure.

FIG. 6B illustrates a side view of a stator winding temperature sensor, according to an embodiment of the present disclosure.

DETAILED DESCRIPTION

Figure 3A:
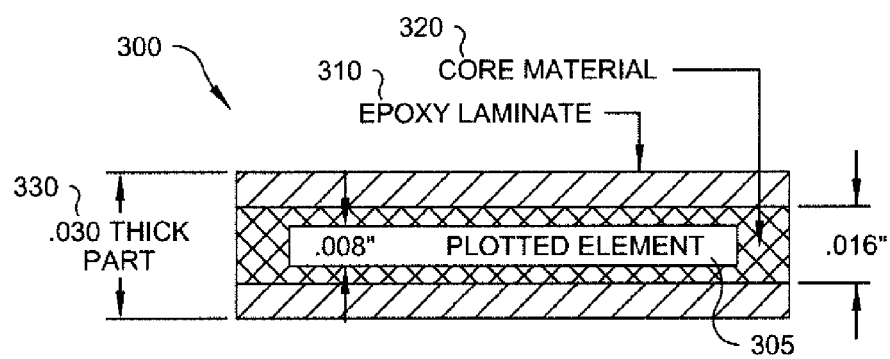
FIG. 3A illustrates a schematic diagram of a body portion of a stator winding temperature sensor.

The following detailed description of the present disclosure refers to subject matter in the accompanying drawings which show, by way of illustration, specific aspects and embodiments in which the present disclosure may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present disclosure is defined by the appended claims, along with the full scope of legal equivalents to which such claims are entitled.

As set forth above, RTDs used to measure temperatures, for example, in the stator windings of motors and generators, are subject to consistent failures resulting from many factors. These factors may include, for example, hostile installation processes, as well as inadequacies in the construction of the RTDs themselves. FIG. 1A illustrates a schematic diagram of a stator winding temperature sensor or RTD 100 useful for measuring stator winding temperature sensor, which may be subject to the above-described shortcomings. RTD 100 includes sensing wire(s) 130 (e.g. a plotted element comprising thin wire coils for sensing) connected to lead wires 135 via a conductive tab 110. Tab 110 may comprise a copper tab, or an element comprising at least conductive traces, for electrically connecting lead wires 135 to sensing wires 130. A primary failure area 105 is shown, including a lead step 120 connecting tab 110 and lead wires 135 with sensing wires 130. In the illustrated embodiment, tab 110 does not protect lead step 120, nor does it protect other significant portions of primary failure area 105.

FIG. 2A illustrates a diagram of a stator winding temperature sensor or RTD 200 similar to that of RTD 100 of FIG. 1A, showing structural strengths (and weaknesses) of various regions of the sensor. For example, element wire section 205 comprising the sensing wires is known to fail at 70-80 pounds per square inch (PSI), whereas element wire sections 215 and 220 adjacent the lead step fail at a mere 60 PSI. A rigid section, such as fiberglass section 210 covering the sensing wires tends to fail at 80 PSI, while fiberglass section 230 yields at 60 PSI. As set forth above, tab section 240 is not suitable for protecting element wire section 215.

FIG. 3A illustrates a schematic diagram of a body portion 300 of a stator winding temperature sensor or RTD, such as RTD 100 of FIG. 1A. Sensing wires or plotted element 305 may be similar to that shown and described with respect to sensing wires 130 in FIG. 1A. Specifically, sensing wires 305 may comprise one or more wire coils configured to detect an operating temperature of an environment based on a change in resistance. In the illustrated embodiment, sensing wires 305 are surrounded by a thickness of core material 320. Core material 320 is surrounded by, or embedded between, for example, layers of epoxy laminate 310 (e.g. a composite laminate such as fiberglass). In the embodiment, an overall thickness 330 of the body portion is 0.030 inches. This 0.030 inch thick fiberglass body, when used with, for example, an 18 gage wire lead step (not shown), makes the RTD susceptible to damage. More specifically, as the sensor is bent around the edge of a stator core during installation and operation, and as the sensor is placed over and under the stator coils, the small diameter of sensing wires 305 are subject to damage.

Embodiments of the present disclosure comprise improved temperature sensors or RTDs, including those specifically configured to measure the temperature of the coils or windings of stators in motors, generators, and auxiliary equipment. Stator winding temperature sensors or RTDs according to embodiments of the present disclosure include at least one sensing wire, or sensing wire coil. The sensing wire may comprise, by way of non-limiting example only, copper or platinum wires. The sensor includes a rigid body, such as a fiberglass body, including a core material surrounding at least a portion of the sensing wire, and an epoxy laminate material over the core material. In an exemplary embodiment, the core material comprises a high-temperature resistant polyimide ribbon or tape, having an adhesive that holds the wire in position on the ribbon. In one embodiment, the polyimide ribbon or tape is a KAPTON® film, tape or ribbon, produced by E. I. du Pont de Nemours and Company. In an embodiment, the adhesive is an acrylic adhesive. In another embodiment, the adhesive is a silicone adhesive. The fiberglass body comprises a thickness adapted to protect the sensing wire. The fiberglass body, as well as the sensing wire, may also be sized such that the sensor may be fit (e.g. friction fit) into the windings of a stator. The sensor may also comprise lead wires for connecting to an external monitoring device, such as a computer, to correlate the output of the sensor with the temperature of the stator.

In some embodiments, the sensors include elongated, conductive tabs to protect the at least one small diameter sensing wire in the vicinity of a "pinch zone". This pinch zone is created where a sensor exits a core of a motor or generator. The elongated tabs may extend from the lead wire and encompass a portion of the sensor wire in a region where the sensing wire extends over an end of the stator.

The disclosed elongated tab is part of the sensor subassembly and repositions the small diameter sensing wire away from the susceptible areas of damage. The elongated tab technique also makes the location of the tab-to-sensing wire joint visible by moving this joint out from under the thicker lead step area. This feature enables motor and generator assemblers to consistently position the RTD sensor and avoid hitting the coils in the vulnerable area. The overall sensor is thus stronger and provides a visible joint location to allow for more precise installation, further reducing the likelihood of damage and thus sensor failure.

A "strike zone" exists along a slot in the coils of the stator, where the sensor is placed, and struck with a mallet, to press fit the sensor into the slots. This portion of the RTD sensor in the prior art is subject to damage, including localized tensile failures in the relatively small diameter sensing wires embedded therein. The above-described 0.030 inch thick fiberglass body of prior art RTDs is too thin to provide adequate protection, leading to sensor failures. Embodiments of the present disclosure also provide for a more robust sensor body, including a thicker layer of material over the sensor, in both the strike zone and the pinch zone to protect the relatively fragile sensing wire. For example, in one particular embodiment, the fiberglass body has a thickness of 0.040 inches to protect the sensing wire in the above-described pinch and strike zones.

As described above, embodiments of the sensor also include one or more lead wires for connecting to an external monitoring device. In an exemplary embodiment, the lead wire comprises an 18 gage lead wire. Embodiments of the present disclosure include sensors having a conductive tab 5 extending from the lead wire and encompassing the lead step. A lead step portion of the sensor is defined where the sensing wire is electrically connected to the lead wire. The tab protects the lead step and the sensing wire in a region where the sensor extends over an end of the stator. According to an embodiment, the tab portion or section is 2.375 inches in length to protect the sensing wire in the pinch zone.

To provide further durability, a stator winding temperature sensor or RTD according to another embodiment of the present disclosure comprises a flexible portion or zone. In an embodiment, the flexible zone includes a tab, such as a conductive copper tab, which extends between the lead wire and the sensing wire or sensing wire coils. The tab may be laminated between layers of a core material comprising, for example, a high-temperature resistant polyimide substrate, including a ribbon or tape. An adhesive may also be utilized for holding the wire and tab in position on the ribbon. In an embodiment, the adhesive is an acrylic adhesive. In an embodiment, the adhesive is a silicone pressure sensitive adhesive. In an embodiment, the flexible zone does not include an epoxy laminate or fiberglass. In this way, the flexible zone does not comprise a portion of the fiberglass body of the sensor.

FIGS. 1B and 1C illustrate schematic diagrams of a top view and a side view of a stator winding temperature sensor 150, respectively, according to an embodiment of the present disclosure. A primary area of failure 155 is shown, including a lead step 120 where lead wires 135 are connected with sensing wire (e.g. plotted thin wire coils) 130 via a conductive tab 160. Lead step 120 and primary area of failure 155 are shown within the length of tab 160. In this way tab 160 protects lead step 120 as well as other significant portions of primary area of failure 155 by altering the location of the tab-to-sensing wire joint outside of primary area of failure 155.

FIG. 2B illustrates a diagram of a stator winding temperature sensor or RTD 250 showing the structural strength of regions of the sensor, according to an embodiment of the present disclosure. A body thickness of 0.040 inches (compared to 0.030 inches) and tab length of 2.375 inches are used in this embodiment. As a result of this added thickness, element wire sections 255 and 295 resist failure up to 120 PSI and element wire section 265 remains intact up to 80 PSI. It should be noted that in the illustrated embodiment, element wire section 295 is relocated from section 270 to fiberglass section 260, which withstands pressured up to 110-120 PSI, compared to fiberglass section 280 which fails at 60 PSI. Moreover, both an elongated tab section 290 as well as the increased body thickness provide additional protection for each of the element wire sections, thus reducing potential failures.

Figure 3B:
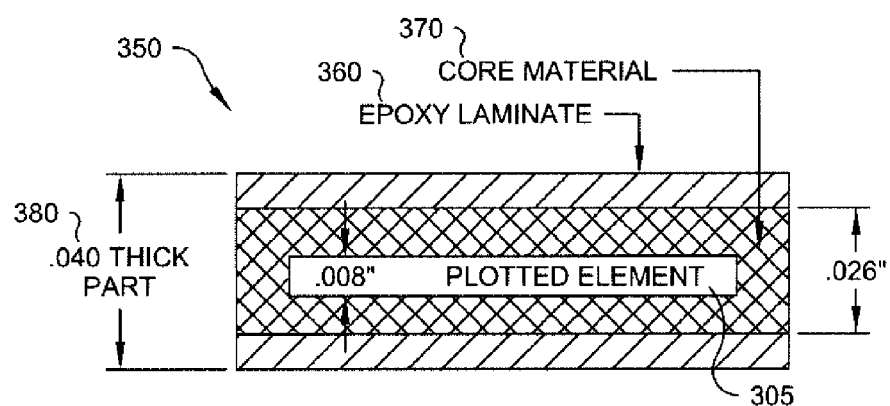
FIG. 3B illustrates a schematic diagram of a body portion of a stator winding temperature sensor, according to an embodiment of the present disclosure.

FIG. 3B illustrates a schematic diagram of a body portion 350 of a stator winding temperature sensor or RTD according to an embodiment of the present disclosure. Sensing wire 355 is surrounded by a thickness of core material 370, which is in turn surrounded by a thickness of epoxy laminate 360. In an embodiment, sensing wire 355 is formed of platinum, copper, nickel or iron-nickel. In an embodiment, the core material comprises a high-temperature resistant polyimide substrate, and an adhesive that is used to hold the wire in position on the substrate. In an embodiment, the adhesive is an acrylic adhesive. In an embodiment, the adhesive is a silicone pressure sensitive adhesive. The overall thickness 380 of body portion 350 is 0.040 inches in the depicted embodiment.

Testing of the above-described improved sensors has provided the following data:

| Pressure Applied | Wire Damage/RTD Failure | | Fiberglass Damage | |
| --- | --- | --- | --- | --- |
|  | .030" thick | .040" thick | .030" thick | .040" thick |
| 40 psi | No | No | No | No |
| 60 psi | Yes | No | No | No |
| 80 psi | Yes | No | No | No |
| 100 psi | Yes | No | No | No |
| 120 psi | Yes | No | Yes | Yes |

The data illustrates that embodiments of the present disclosure may increase the strength of the internal sensing wires to at least 120 PSI. In addition, in these embodiments, external fiberglass damage is visible before damage to the internal sensing wires is sustained. This allows for detection of overstressing the sensor and facilitates process improvement and prevention of future damage. Because end users typically provide an upper limit to the thickness of the sensor body (limited by the dimensions of the stator openings), the thickness of the protective material around the sensing wires is limited. Other thicknesses may be used without departing from the scope of this disclosure.

Figure 4:
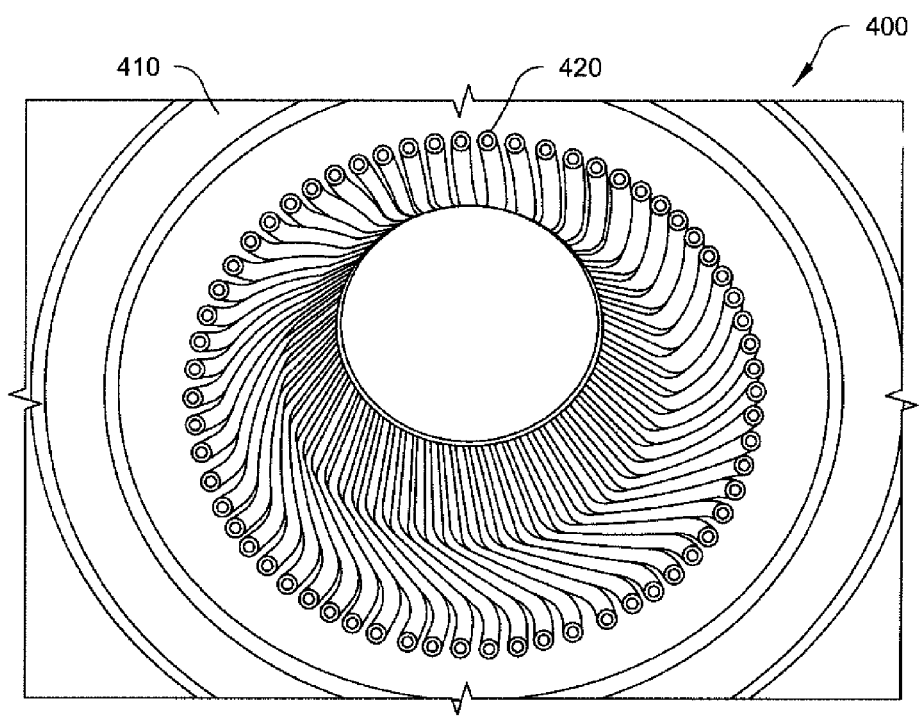
FIG. 4 illustrates an end view of a system including a stator winding temperature sensor, according to an embodiment of the present disclosure.
Figure 5:
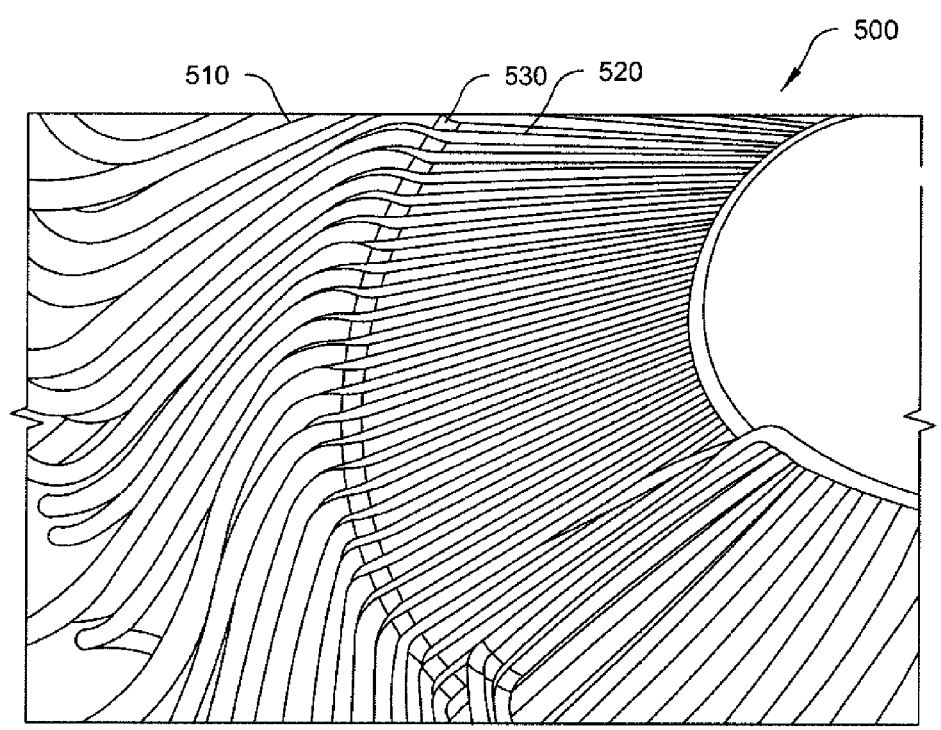
FIG. 5 illustrates a side view of a system including a stator winding temperature sensor, according to an embodiment of the present disclosure.

FIG. 4 illustrates an end-view of a system including a stator winding temperature sensor 400 according to an embodiment of the present disclosure. Sensor lead wires 420 are shown extending beyond the end of stator 410. FIG. 5 illustrates a side-view of a system including a stator winding temperature sensor 500, according to an embodiment of the present disclosure. Sensor lead wires 510 are shown connected to sensor bodies 520, the bodies housing smaller diameter sensing wires, such as platinum wires in an embodiment. Tabs 530 protect the sensing wires in the vicinity of the end of the stator, or pinch zone. According to an embodiment, the stator winding temperature sensor shown in FIGS. 4 and 5 has a tab as depicted in FIG. 1B (e.g. tab 160) and a body as depicted in FIG. 3B (e.g. body portion 350).

FIG. 6A illustrates a top view of a stator winding temperature sensor or RTD 650 according to an embodiment of the present disclosure. A lead step 620 electrically connects lead wires 635 with sensing wire 630 (e.g. plotted thin wire coils or sensing wires which may be traces formed on a substrate) via a flexible portion or zone 670. Flexible zone 670 allows for flexibility of the sensor outside of the slot into which sensor 650 is placed, preventing, for example, cracking around the junction of the lead step and the sensing wires common in the sensors of the prior art. Tab 660 protects lead step 620, flexible zone 670 and sensing wire 630 in a region where sensor 650 is adapted to extend over an end of the stator. Sensing wire 630 is surrounded by a thickness of core material 625, which has surrounding layers of epoxy laminate 610 forming a fiberglass body 631. The thickness of core material 625 and epoxy laminate 610 may be selected such that sensing wire 630 is adapted to be fit to a stator, for example, friction fit between windings of the stator coil.

In one embodiment, flexible zone 670 is arranged between lead step 620, and epoxy laminate 610 having core material 625 surrounding at least a portion of sensing wire 630. Flexible zone 670 may include tab 660, such as a conductive copper tab. Tab 660 extends from lead wires 635 and is laminated between layers of a high-temperature resistant polyimide tape or ribbon having an adhesive that holds the wire and tab in position on the ribbon. In an embodiment, the adhesive is an acrylic adhesive. In an embodiment, the adhesive is a silicone pressure sensitive adhesive. In an embodiment, flexible zone 670 does not include an epoxy laminate or fiberglass (e.g., the flexible zone does not include a fiberglass body). In an embodiment, the length of flexible zone 670 may be longer or shorter than the lead step. For example, the flexible zone may be from 0.5 inches to 10 inches in length and the lead step may be from 0.5 inches to 5 inches in length. In an embodiment, the flexible zone may be from 2 inches to 4 inches in length and the lead step may be from 1 inch to 2 inches in length.

Tab 660 may comprise a flexible substrate, which may be of polyimide, having conductive traces 665, such as patterned copper traces thereon, forming a flexible conductive circuit for electrically connecting lead wires 635 to sensing wire 630. In other embodiments, conductive traces 665 may be formed from any suitable conductor, for example, metallic wire. Conductive traces 665 may be attached to lead wires 635 and sensing wire 630 via soldering, by way of non-limiting example only. In other embodiments, conductive traces 665 may be formed from a portion of lead wires 635, or from a portion of sensing wire 630. The polyimide tape or ribbon may be applied to a top and bottom of tab 660. The tape layers provide physical protection for traces 665 and serve as a dielectric layer. Alternatively, a separate dielectric insulating material may be provided. The polyimide tape on flexible zone 670 may overlap the epoxy laminate of the sensitive length by a distance of up to about an inch and the epoxy of the lead step 620 by a distance of about an inch. In testing, embodiments of sensor 650 as disclosed herein have permitted angles of up to 180° between lead step 620 and sensing wire 630 without damage.

FIG. 66 illustrates a side view of a stator winding temperature sensor according to an embodiment of the present disclosure. In one embodiment, the overall thickness of the body portion 645 is about 0.040 inches in accordance with the embodiments set forth above with respect to FIGS. 1B, 2B and 3B.

The use of a sensor having a fiberglass body with a core formed of a polyimide tape and an acrylic adhesive surrounding the sensing wire, a flexible zone that lacks a fiberglass body and has a tab that is laminated between at least one layer of polyimide tape and an acrylic adhesive, and a lead step where the tab is surrounded by an epoxy laminate that is laminated between one or more layers of polyimide tape having an acrylic adhesive, provides for enhanced durability of the sensor. For example, the use of an acrylic adhesive enhanced the durability of the sensor, e.g., by about 4 times that of a corresponding sensor formed with a silicone adhesive when failure rate was tested by dropping a 32 oz weight from anywhere from 10 inches up to 60 inches above the sensor, e.g., in the strike zone or the pinch zone.

Also disclosed herein is a method for manufacturing a temperature sensor for sensing temperature of a stator. The method includes fitting a sensing wire or sensing wire coil to a stator to sense a temperature of the stator. At least a portion of the sensing wire is surrounded with a core material comprising a high-temperature resistant polyimide substrate such as a ribbon or tape having an adhesive, e.g., an acrylic adhesive, and a fiberglass body having an epoxy laminate material over the core material. A lead wire is electrically connected to an external monitoring device. The sensing wire is electrically connected to the lead wire at a lead step, or is electrically connected to a tab within a flexible zone which is electrically connected to the lead wire at a lead step. The tab may extend from the lead wire and encompassing at least the lead step to protect the lead step and the sensing wire in a region where the sensor is adapted to extend over an end of the stator.

Although specific embodiments have been illustrated and described herein, it will be appreciated by those of ordinary skill in the art that any arrangement which is calculated to achieve the same purpose may be substituted for the specific embodiment shown. It is to be understood that the above description is intended to be illustrative, and not restrictive. The scope of the present subject matter should be determined with reference to the appended claims, along with the full scope of equivalents to which such claims are entitled.

What is claimed is:

1. A temperature sensor for sensing temperature of a stator and communicating the sensed temperature to an external monitoring device, comprising:
    at least one sensing wire, the sensing wire adapted to be fit to the stator and adapted to sense temperature of the stator;
    a fiberglass body, including:
        a core material comprising a polyimide substrate having an acrylic adhesive surrounding at least a portion of the sensing wire; and
        an epoxy laminate material over the core material;
    a lead wire for connecting to the external monitoring device;
    a lead step where the sensing wire is electrically connected to the lead wire; and
    a tab extending from the lead wire and encompassing at least a portion of the lead step, the tab comprising a flexible portion extending at least partially over a length thereof, the flexible portion of the tab comprising a flexible conductive circuit between and connecting the at least one sensing wire to the lead wire, wherein the tab protects the lead step and the sensing wire in a region where the sensor is adapted to extend over an end of the stator.

2. The sensor of claim 1, wherein the at least one sensing wire includes a platinum sensing wire.

3. The sensor of claim 1, wherein the sensing wire is adapted to be friction fit to a stator.

4. The sensor of claim 1, wherein a thickness of the fiberglass body is approximately 0.04 inches.

5. The sensor of claim 1, wherein a thickness of the fiberglass body is greater than approximately 0.04 inches.

6. The sensor of claim 1, wherein the lead wire includes an 18 gage lead wire.

7. The sensor of claim 1, wherein a length of the tab is approximately 2.375 inches.

8. The sensor of claim 1, wherein the at least one sensing wire includes a copper sensing wire.

9. The sensor of claim 1, wherein the lead step comprises a fiberglass body including an epoxy laminate material over at least a portion of the tab, and a polyimide and an adhesive over at least a portion of the fiberglass body.

10. The sensor of claim 9, wherein the adhesive comprises an acrylic adhesive.

11. The sensor of claim 9, wherein a portion of the tab between the lead step and the fiberglass body surrounding the core material and sensing wire is surrounded by a polyimide and an adhesive but is not surrounded by fiberglass.

12. The system of claim 11, wherein the stator winding temperature sensor is adapted to measure operating temperature of the stator based on a sensed change in resistance in the at least one sensing wire.

13. The system of claim 1, wherein the external monitoring device includes a personal computer.

14. A method for manufacturing a temperature sensor for sensing temperature of a stator, comprising:
- fitting a sensing wire to the stator to sense temperature of the stator;
- surrounding at least a portion of the sensing wire with a core material comprising a polyimide substrate having an acrylic adhesive;
- surrounding the core material with an epoxy laminate material to form a fiberglass body;
- electrically connecting a lead wire to an external monitoring device; and
- electrically connecting the sensing wire to the lead wire at a lead step having a fiberglass body surrounding at least a portion of an elongated tab which is laminated with a polyimide substrate having an acrylic adhesive,
- wherein the elongated tab extends from the lead wire and encompasses the lead step to protect the lead step and the sensing wire in a region where the sensor is adapted to extend over an end of the stator, and wherein at least a portion of the elongated tab comprises a flexible portion, the flexible portion comprising a flexible conductive circuit between the sensing wire and the lead wire for connecting the sensing wire to the lead wire.

15. The method of claim 14, wherein fitting a sensing wire to the stator includes friction fitting the sensing wire to the stator.

16. The method of claim 14, wherein fitting a sensing wire to the stator includes fitting a platinum sensing wire to the stator.

17. The method of claim 14, wherein surrounding at least a portion of the sensing wire with a fiberglass body includes surrounding the sensing wire with a fiberglass body having a thickness of greater than approximately 0.04 inches.

18. The method of claim 14, wherein electrically connecting a lead wire to an external monitoring device includes electrically connecting an 18 gage lead wire.

19. The method of claim 14, wherein providing an elongated tab includes providing a tab having a length of at least approximately 2.375 inches.

20. The method of claim 14, wherein electrically connecting the sensing wire to the lead wire at the lead step includes electrically connecting the sensing wire to a portion of the elongated tab which extends beyond the lead step and is surrounded by a polyimide substrate having an adhesive but not surrounded by fiberglass.

* * * * *